United States Patent [19]

Lindae et al.

[11] Patent Number: 4,924,359

[45] Date of Patent: May 8, 1990

[54] MOTOR VEHICLE HEADLIGHT

[75] Inventors: Gerhard Lindae, Leonberg; Rainer Neumann; Peter Perthus, both of Stuttgart, all of Fed. Rep. of Germany

[73] Assignee: Robert Bosch GmbH, Stuttgart, Fed. Rep. of Germany

[21] Appl. No.: 237,195

[22] Filed: Aug. 29, 1988

[30] Foreign Application Priority Data

Sep. 17, 1987 [DE] Fed. Rep. of Germany ....... 3731232

[51] Int. Cl.[5] .............................................. B60Q 1/04

[52] U.S. Cl. ........................................ 362/61; 362/80; 362/296; 362/297; 362/346; 362/347

[58] Field of Search .................. 362/61, 80, 306, 346, 362/297, 347, 348, 296

[56] References Cited

U.S. PATENT DOCUMENTS

| | | | |
|---|---|---|---|
| 4,731,713 | 3/1988 | Perthus | 362/297 |
| 4,754,374 | 6/1988 | Collot | 362/61 |
| 4,772,988 | 9/1988 | Brun | 362/61 |

*Primary Examiner*—Ira S. Lazarus
*Assistant Examiner*—Sue Hagarman
*Attorney, Agent, or Firm*—Edwin E. Greigg

[57] ABSTRACT

The reflection surface of the reflector is composed of four segments depending on the low-beam light distribution pattern according to the ECE or SAE standard. For the ECE low-beam light distribution pattern, segment is part of a paraboloid of revolution; segment is a parellipsoid; reflector segment is a parellipsoid; and reflector segment is a general paraboloid. The various segments merge continuously and with smooth transitions with one another. For the SAE low-beam light distribution pattern, the reflector segment is a paraboloid of revolution; the reflector segment is a general paraboloid; the reflector segment is a paraboloid of revolution; and the reflector segment is a general paraboloid; in the SAE low-beam light distribution pattern as well, the reflector segments merge with one another continuously and with smooth transitions. The original beam of light produced by the various reflector surfaces of the reflector 1 is substantially equivalent to the low beam as allowed by law and that is suitable for the road surface, so that the dispersion plate can largely be dispensed with, or else can be inclined steeply or need have only a few optical devices.

13 Claims, 3 Drawing Sheets

MOTOR VEHICLE HEADLIGHT

BACKGROUND OF THE INVENTION

The invention relates to a headlight as defined hereinafter. In a fog light known from German Offenlegungsschrift 35 27 391, the reflector per se comprises a plurality of portions wherein an upper part of one vertical section is part of an ellipse, and the section along the horizontal center plane is part of a parabola. The various focal lengths of the paraboloid, the ellipse and the parabola are identical. The reflector therefore has only a single focal length. The focal point is in the cylindrical incandescent coil, which is located on the optical axis.

With a fog light of the above type, neither low-beam light distribution nor an asymmetrical 15° upward slope in the light distribution is attainable. In fog lights, the occasional glare originating at the transition from one reflector shape to another is insignificant, but in a low-beam headlight, such glare is quite irritating to drivers of oncoming motor vehicles.

OBJECT AND SUMMARY OF THE INVENTION

The reflector for motor vehicle headlights according to the invention enables the manufacture of a sheet metal or plastic reflector equipped with a bulb having an axial coil, without a bulb shield. Such a headlight furnishes a low-beam headlight having the European standard pattern for asymmetrical low-beam light distribution, with a sharp boundary between light and dark that to the left of center extends horizontally and to the right of center slopes upward at an angle of 15°. With this headlight, the entire reflector surface area is utilized, and there is a considerable increase in light flux compared with the previous embodiment of low-beam headlights having an H4 bulb with a dimmer cap, along with improved lateral dispersion and illumination of the area ahead of the vehicle. By suitably increasing the reflector surface area that defines the range of the headlight, greater intensity of illumination is attained.

Further advantages and improvements over the earlier disclosure discussed above will become apparent hereinafter. The embodiment of the headlight defined accordingly introduces a reflector with smooth transitions, appearing as a curved surface and having a common vertex.

In addition, as explained herein, a light distribution in accordance with the European ECE standard or the United States SAE standard is attained, in which a dispersion plate can largely be dispensed with.

It is also advantageous to dispense with the bulb shield, as this prevents heat buildup and considerably increases the life of the bulb.

Additionally, it is advantageous to dispose the bulb vertically above the optical axis to make the light/dark boundary sharper on the left horizontal side of the light distribution pattern.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
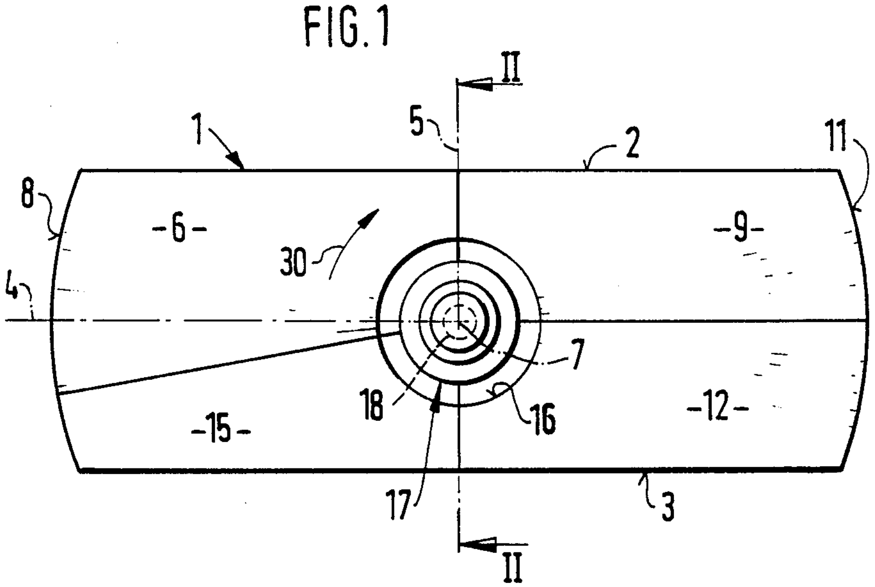
FIG. 1 is a schematic view of the back of a rectangular reflector of a low-beam headlight for motor vehicles.

In a low-beam headlight for motor vehicles, FIG. 1 shows the back of a rectangular reflector 1, the reflector surface area of which comprises a plurality of segments, four in number in the present exemplary embodiment. The reflector 2 has an upper limiting edge 1 and a lower limiting edge 3, both extending substantially parallel to the horizontal axis 4 of the reflector and having no optical effect. A first segment 6, which adjoins the upper limiting face 2 and extends downward at an angle of up to 15°, beginning at the reflector axis 7 and the horizontal axis 4, and extends outward from the vertical axis 5 of the reflector 1 as far as the left limiting edge 8, is part of a paraboloid. A second segment 9, which is part of a parellipsoid which is a geometrical body formed by an elliptical paraboloid determined by an ellipse in one plane and a parabola in the plane perpendicular to it, likewise adjoins the upper limiting edge 2 and extends as far as the horizontal axis 4 and from the right-hand limiting edge 11 of the reflector as far as its vertical axis 5. A third segment 12 extends from the lower limiting edge 3 upward as far as the horizontal axis 4 and extends from the right-hand limiting edge 11 as far as the vertical axis 5 of the reflector. A fourth segment 15 extends upward from the lower limiting face of the reflector as far as the sector of the first segment extending downward by 15° from the horizontal axis 4, and extends from the left-hand limiting edge 8 as far as the vertical axis 5 of the reflector. The segment 15 is part of a paraboloid. This is a three-dimensional shape that has different parabola focal lengths in horizontal and vertical section; the result, at the transition from the horizontal to the vertical and vice versa, is a chain of parabola focal lengths in the axis of the reflector.

The overall reflector appears to the observer to be a body having seamless transitions among the parts of the body represented by the reflector segments and has a single common vertex. An incandescent bulb 17 for producing a low beam is inserted into the vertex opening 16 of the reflector 1 (see FIG. 2); the bulb is of the type which may be used for either the European standard (H1 bulb) or the United States standard (9006 bulb). The bulb has an axial incandescent filament 18, aligned substantially parallel to or coaxially with the reflector axis 7, and has no bulb shield. Since a bulb shield, which hinders both ventilation and the light output of the lamp, is absent, heat buildup in the vicinity of the bulb is avoided and the life of the bulb is increased. Because the entire reflector surface area is utilized in the case of an H1 bulb, there is a considerable increase in light flux compared with the known low beam produced with a standard H4 bulb provided with a bulb shield. As a result, even if the reflector 1 is of small dimensions, a high-quality low beam is produced. Instead of the H1 bulb or the 9006 bulb, a gas discharge lamp can also be used. The low-beam headlight in FIG. 2 has a rectangular reflector having a reflection surface 20, a light outlet opening 21 and a vertex 22. The flange of an incandescent bulb 17 is axially supported and radially centered on the end face of a neck 23 protruding from the vertex 22. The incandescent bulb 17 has a cylindrical incandescent filament 18, the cylinder axis of which is virtually parallel to or coaxial with the axis of reflection 7. In a version to be described in detail below, the cylinder axis of the filament 18 installed vertically above and/or laterally offset from the optical axis 7. To vary the course of the beam from the bulb, one or more ribs that shade the bulb and extend along the bulb may be provided.

Figure 2:
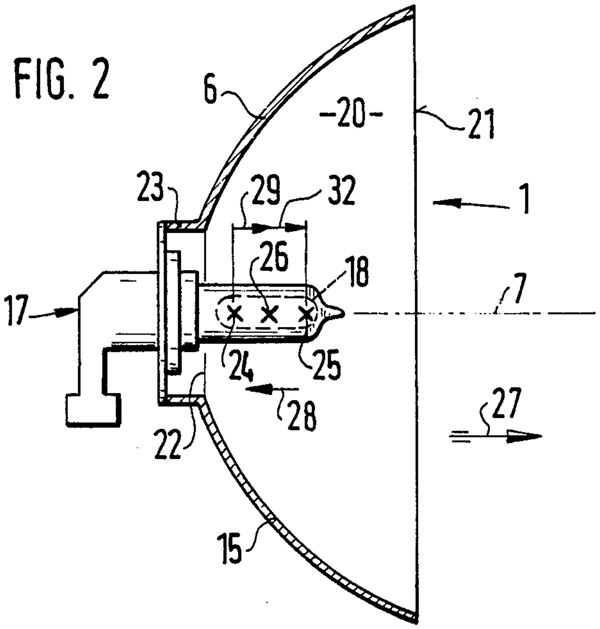
FIG. 2 is a vertical section taken along the line II—II of FIG. 1 through a headlight in which an incandescent bulb having a coil is inserted.

In FIG. 2, the segments 6 and 15 of the reflection surface 20 can be seen in section, in the direction of the reflected rays indicated by the arrow 27. The uppermost, first segment 6 is a portion of a first paraboloid, and the lower, fourth segment 15 is a portion of a second paraboloid. The focal point 24 of the upper, first segment 6 is located in the rear portion of the filament 18, that is, the portion pointing toward the vertex 22 of the reflector 1, and the vertical focal point 25 of the general paraboloid 15, which is visible in section, is located in the front portion of the filament 18, that is, the portion pointing toward the light outlet opening 21 of the reflector 1. The chain of parabola focal lengths occurring in the general paraboloid extends from the focal point 25 toward the focal point 24, as indicated by the arrow 28. The second and third segments 9 and 12, not visible in this sectional view of FIG. 2, are each part of a portion of a first and second parellipsoid; one focal point 26, of the upper, second section 9, is visible in the sectional view. With the second segment 9, a chain of focal lengths is produced that begins at the focal point 24 and extends as far as the focal point 26, as indicated by the arrow 29. With the third segment 12 as well, a chain of focal lengths is produced, beginning at the focal point 26 and extending to the focal point 25 (arrow 32).

The totality of the focal length chain is a consequence of the reflector geometry and is ascertained by means of incremental imaging scanning in the direction of rotation of the arrow 30 of FIG. 1. The focal point chain of the upper two segments is located in the vicinity of the beginning of the filament, near the reflector vertex, while that of the lower two segments is located at the end of the incandescent filament 18 remote from the vertex. The downward shift of the filament images resulting from the continuous migration of the incident focal lengths from the beginning to the end of the filament, and vice versa, is attained by suitable reflector geometry. This also makes it possible to dispose all the filament images below the light/dark boundary.

The different geometries of the various segments result in a continuous overall reflector shape having no marked transition between the segments. The transitions among the individual geometrical shapes of the segments are embodied such that they have a common tangent. This makes them easier to manufacture from sheet metal or plastic; the glare produced at the edges or transitions of the segments is eliminated, and oncoming drivers are not "blinded" by known improperly constructed reflectors. The segments forming the reflector have a common vertex point, and the geometrical shapes of the various segments can be made larger or smaller for the sake of adaptation to desired light distributions among one another. The various shapes of the segments may be accommodated in a round, oval, quadrilateral or polygonal headlight.

Figure 3:
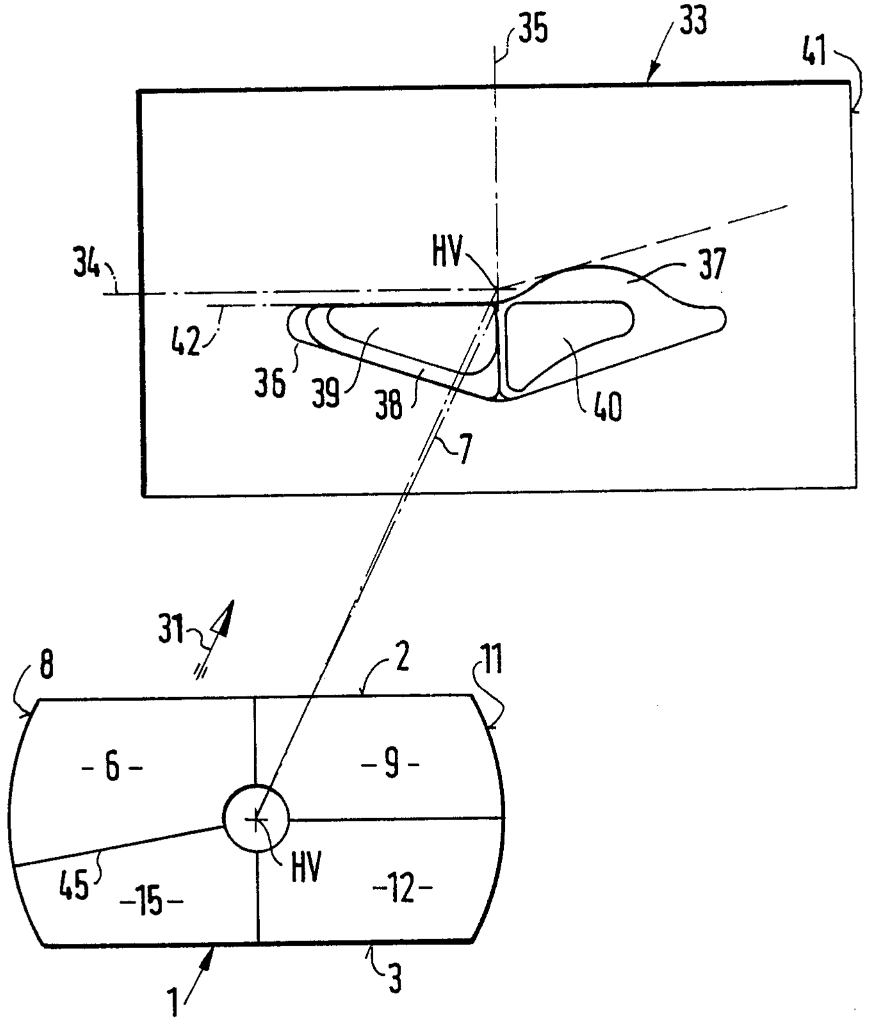
FIG. 3 is a schematic representation of the light distribution of the reflector onto a test screen, in accordance with European standards.

FIG. 3, is a view looking in the direction of light rays reflected by the reflector 1 as indicated by the arrow 31, shows a test screen 33 having a horizontal center plane 34 and a vertical center plane 35, which intersect at the HV point. The first segment 6 produces the light field 37 that is part of the overall light distribution pattern 36. The light field 37, which begins approximately at the vertical center plane 35 and extends to the right to the outer right-hand side 41 of the test screen, forms a part of the light/dark boundary, with the typical upward 15° slope on the right.

The second segment 9 forms the light field 38 of the overall light distribution pattern 36, beginning at the vertical center plane 35. Segment 12 forms the light field 39, and segment 15 forms the light field 40.

Because the reflector axis 7 is inclined horizontally downward relative to the HV point of the test screen 33, the original beam of light, comprising the light fields 37, 38, 39, 40, falls below the prescribed light/dark boundary 42. Because of the parameters according to the invention of the reflection surface 20 as a sum of the segments 6, 9, 12, 15, the original beam of light is equivalent to the resultant original light distribution; that is, the light distribution without a dispersion plate already corresponds substantially to the low beam that illuminates the road surface. Therefore, the dispersion plate, not shown, needs few optical means, if any, for shaping the original light beam. As a result, the dispersion plate can be inclined at a sharper angle.

With an asymmetrical, horizontal disposition of a reflector, the surface of the reflector, which is utilized to define the range, can be increased in size, thus producing a higher intensity of illumination in the distance.

In the case of light distribution by the European HCE standard using an H1 bulb, it proves to be particularly advantageous, in order to increase the sharpness of the light/dark boundary on the left, horizontal side of the light distribution pattern, to shift the bulb vertically upward relative to the optical axis; a shift on the order of magnitude of 0.3 to 0.6 mm is desirable. This makes it possible to dispose the coil images precisely in a horizontal line, thus increasing the gradient at the light-/dark transition.

Figure 4:
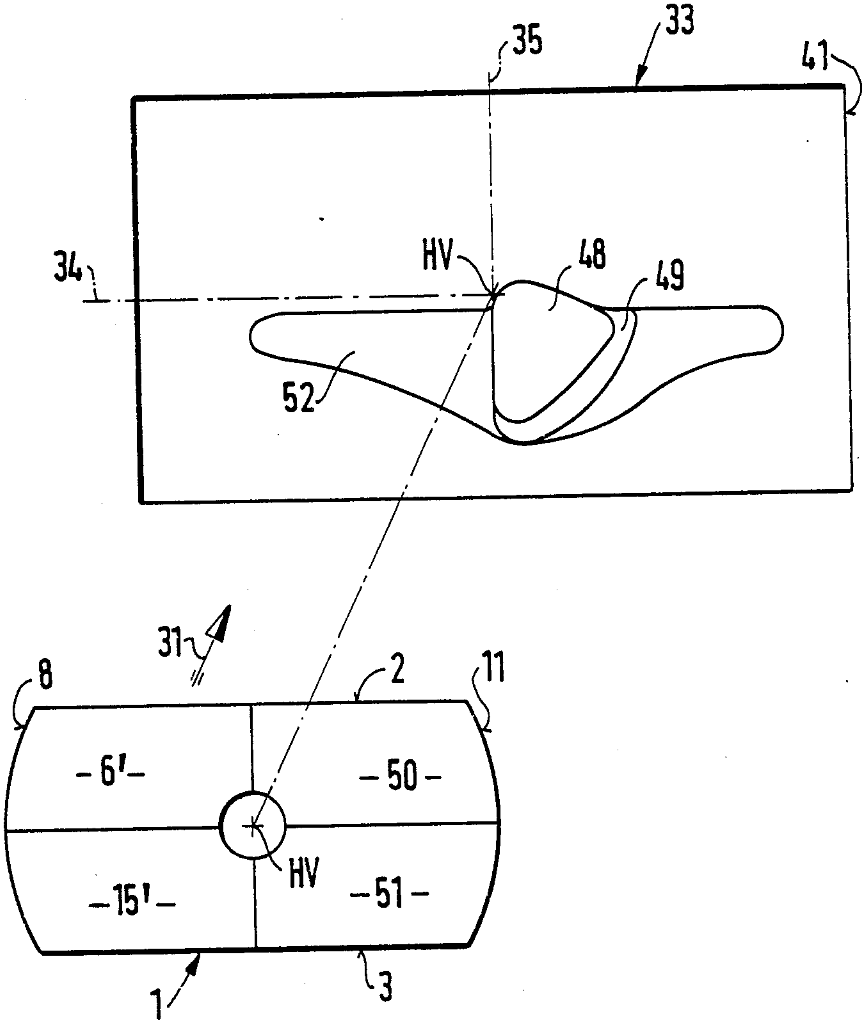
FIG. 4 is a schematic representation of the light distribution by the United States standard.

A reflector arrangement as shown in FIG. 4, which again comprises four segments 6', 50, 51 and 15', does not have a 15° line 45 as FIG. 3 does. This arrangement is for a reflector to meet the United States SAE standard, which again has different segments each extending as far as the center axes of the reflector. Unlike the European ECE standard reflector, in the SAE reflector arrangement the second segment 50 comprises a part of a third paraboloid and the third segment 51 is a part of fourth paraboloid. In particular, the segments 50, 51 form the light field 48, and the first and fourth segments 6', 15' form the light field 49. The entire reflector produces an overall light distribution pattern 52. This reflector geometry leads to an optimization of the so-called "hot spot", or in other words the brightest zone of the United States low-beam headlight. For the United States arrangement using standard 9006 bulbs, all the filament images are concentrated by the reflector geometry on the lower right quadrant of the test screen 33. The geometrical arrangement of the reflector has the effect not only of increasing the volume of light, but also that the maximum illumination intensity is caused to be located just below the light/dark boundary, thus making for a long range of the headlight.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A headlight for motor vehicles, having a reflector (1) with a reflecting surface (20) made up of a plurality of related segments, each of said segments are formed by different conical sectional curves which merge smoothly with one another and a lamp of axial extension is disposed on a vertical and horizontal axis in the reflector, said reflector comprises first and second reflector halves divided by said vertical axis through the headlight axis, said first reflector half is composed of a first lower segment (15) in the form of a second paraboloid and a first upper segment (6) formed by a second paraboloid which given asymmetrical light distribution of the headlight serves as a high beam, and said second reflector half has a second upper segment (9, 50) and a second lower segment (12) formed by conical sectional curves.

2. A headlight as defined by claim 1, in which said second upper segment and said second lower segment of said second reflector half are each a parellipsoid.

3. A headlight as defined by claim 1, in which said second upper segment of said second reflector half is a second paraboloid parabola and said second lower segment of said second reflector half is a first paraboloid.

4. A headlight as defined by claim 1, in which the different geometrically shaped parts of the overall reflector have a common vertex point.

5. A headlight as defined by claim 1, in which said reflector has a horizontal section above an optical axis (7) which is taken through a paraboloid, and a horizontal section below the optical axis (7) is a section through a paraboloid, and a vertical section to the left of the optical axis (7) is a section through a first and second paraboloid, and a section to the right of the optical axis (7) is a section through a first and second paraboloid.

6. A headlight as defined by claims 5, in which the bulb is disposed in a position which is offset upwardly relative to the optical axis (7).

7. A headlight as defined by claim 6, in which the focal point of the paraboloid (6') is located in the end of the incandescent filament (18) near the vertex, and the focal point chain of the segments (9, 50) disposed above the optical axis (7) begins at the end of the filament (18) near the reflector vertex and extends in the direction of the end of the filament (18) remote from the reflector vertex, and the focal point chain of the reflector segments (12, 51) begins along the filament (18) and extends as far as the end of the filament (18) remote from the vertex, and the focal point continum for the reflector segment (15, 15') begins at the end of the filament remote from the vertex.

8. A headlight as defined by claim 1, in which said reflector has a horizontal section above an optical axis (7) which is taken through a paraboloid or a parellipsoid, and a horizontal section which lies below the optical axis (7) is a section through a parellipsoid, and a vertical section to the left of the optical axis (7) is a section through a paraboloid, and a section to the right of the optical axis (7) is a section through a first parallipsoid and a second parellipsoid.

9. A headlight as defined by claims 8, in which the bulb is disposed in a position which is offset upwardly relative to the optical axis (7).

10. A headlight as defined by claim 9, in which the various reflector segments form a focal point chain that is located inside the incandescent filament (18).

11. A headlight as defined by claim 10, in which the various reflector segments form a focal point chain that is located inside the incandescent filament (18) and exceeds the length of the incandescent filament.

12. A headlight as defined by claim 8, in which said bulb, has an incandescent filament (18) coaxial with the axis of the headlight disposed in the reflector, and the paraboloid located above the optical axis (7) continues at a segment angle of 15° below the optical axis.

13. A headlight as defined by claims 12, in which the bulb is disposed in a position which is offset upwardly relative to the optical axis (7).

* * * * *